No. 876,808. PATENTED JAN. 14, 1908.
L. T. KINERT.
CEREAL DISH.
APPLICATION FILED SEPT. 7, 1907.

WITNESSES
J. H. Schmidt
Perry B. Turpin

INVENTOR
Lorin T. Kinert.
BY Munn & Co.
ATTORNEYS

UNITED STATES PATENT OFFICE.

LORIN T. KINERT, OF BOISE, IDAHO.

CEREAL-DISH.

No. 876,808.      Specification of Letters Patent.      Patented Jan. 14, 1908.

Application filed September 7, 1907. Serial No. 391,805.

*To all whom it may concern:*

Be it known that I, LORIN T. KINERT, a citizen of the United States, and resident of Boise, in the county of Ada and State of Idaho, have invented an Improvement in Cereal-Dishes, of which the following is a specification.

My invention is an improvement in dishes and has for an object to provide a dish especially adapted for that class of cereal foods which depend largely on crispness for their palatability; and the invention consists in certain novel constructions and combinations of parts as will be hereinafter described and claimed.

Figure 1:
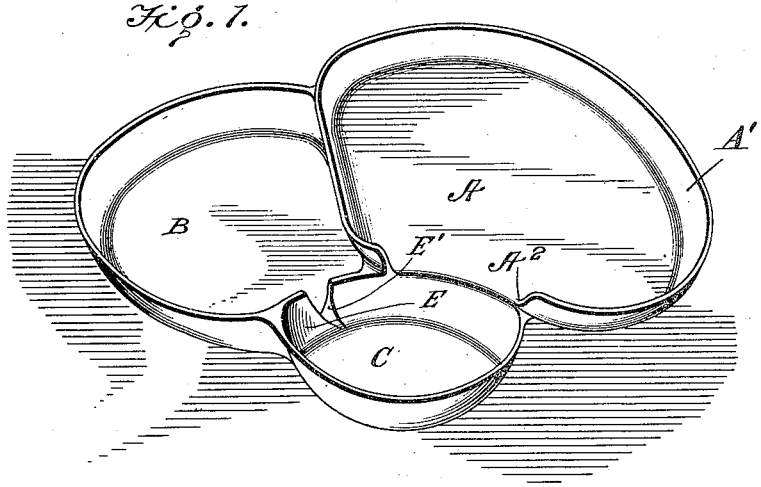
Figure 2:
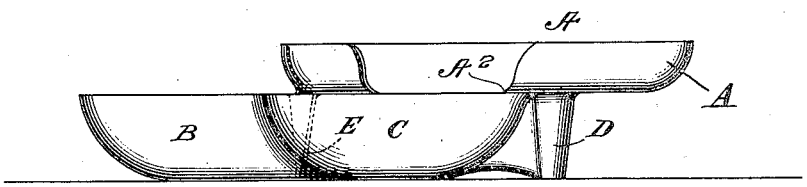
Figure 3:
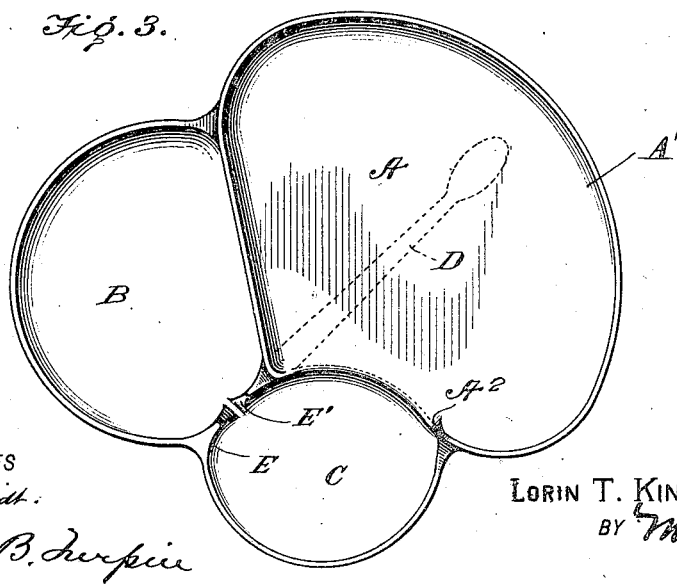

In the drawing, Figure 1 is a perspective view; Fig. 2 an edge view; and Fig. 3 a top plan view of a dish embodying my invention.

As shown, the dish is divided into three compartments, A, B and C. The compartments A and B may be termed "supply compartments", and are designed, respectively, to receive cereal food, such as Force, and the like, and cream. The compartment C is the "serving compartment", and is arranged below the level of the compartment A, and the rim A' of the compartment A is interrupted at A², affording a free discharge of the material from the compartment A to the serving compartment C. The compartment A being above the level of the compartment C, is mounted on a support D which may extend transversely below the compartment A, as will be understood from full lines in Fig. 2 and dotted lines in Fig. 3.

The compartments B and C are on about the same level, and a comparatively contracted opening E' is formed in the rim or partition E between the compartments B and C, through which the cream may pass from the compartment B to the compartment C, and in the use of the device, the opening E' may be dammed by the cereal material within the serving compartment.

In the operation of the invention, the cereal in the main supply compartment A will be kept from the cream until it is desired to mix the same for immediate use, and the dish will facilitate proper mixing of the cream and cereal to suit different tastes.

I claim:

1. The dish herein described, comprising two supply compartments and a serving compartment, one of the supply compartments and the serving compartment being on the same level and having an intermediate partition provided with a comparatively contracted opening for the discharge of cream or the like from such supply compartment to the serving compartment, and the other supply compartment being above the level of the serving compartment and having a rim interrupted or broken away at the juncture of the said supply compartment with the serving compartment, whereby material may be conveniently scraped from such supply compartment into such serving compartment, and a supporting device for such supply compartment, substantially as set forth.

2. A dish for cereals and the like, made with two supply compartments and one serving compartment, the latter and one of the supply compartments being on the same level, and the other supply compartment being above the other two compartments and having a rim interrupted or broken away at its juncture with the serving compartment, the rim or partition between the serving compartment and the first said supply compartment being provided with a comparatively contracted opening, substantially as set forth.

3. A dish made with two supply compartments and one serving compartment, a comparatively contracted opening being provided between one of the said supply compartments and the serving compartment, and the other supply compartment being arranged above the serving compartment and having a rim interrupted or broken away at the juncture of said supply compartment with the serving compartment substantially as set forth.

LORIN T. KINERT.

Witnesses:
HATTIE B. DAVIDSON,
S. D. FAIRCHILD.